United States Patent Office 2,837,303
Patented June 3, 1958

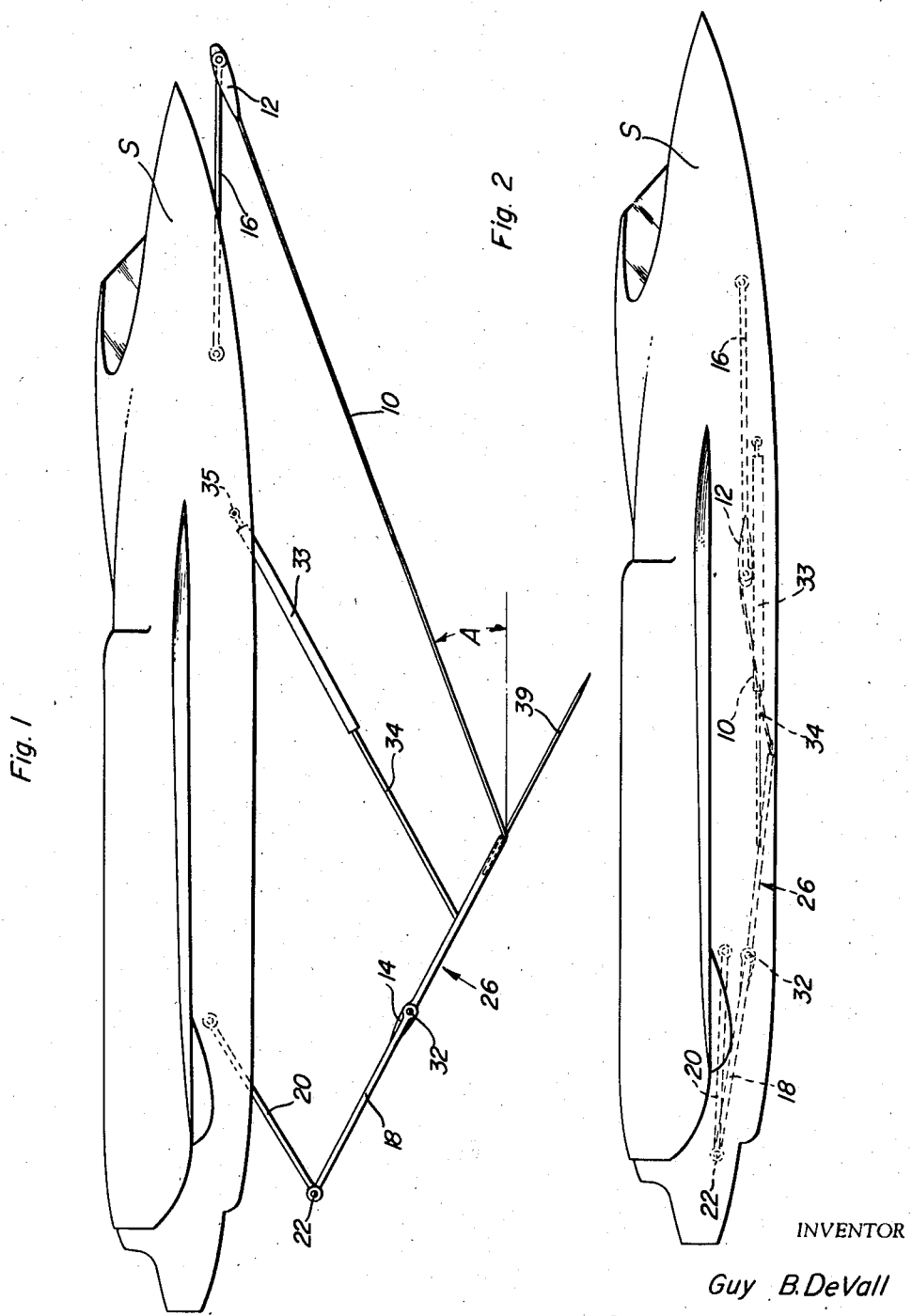

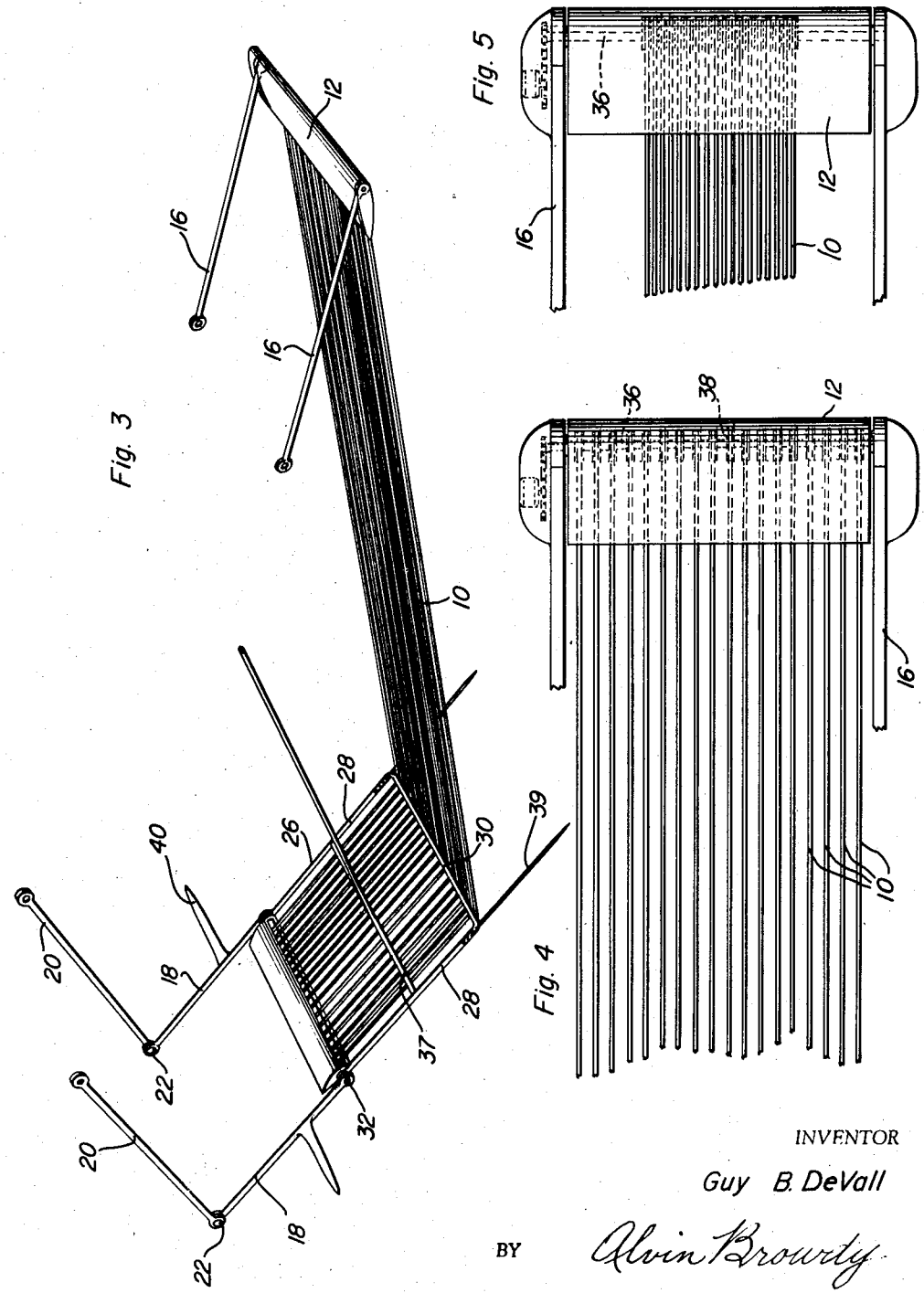

2,837,303

LANDING GEAR FOR SEAPLANES

Guy B. De Vall, Hollywood, Calif.

Application February 2, 1956, Serial No. 563,056

17 Claims. (Cl. 244—105)

This invention relates to landing gear for water based aircraft and, more particularly, to novel landing gear which enable a heavily loaded aircraft to take off and land easily even in rough water.

Previously proposed landing gear for seaplanes have included one or more relatively short skis which have a flat bottom for contact with the water. Such landing gear have invariably resulted in heavy impact when the skis first hit the surface of the water with the resultant bouncing of the plane back into the air. Further, the struts in previously proposed landing gear which connect the skis to the hull are semi-rigid, and the kinetic energy upon impact is absorbed by the body of the plane with resultant weakening of its structure.

It is therefore an object of the present invention to provide an improved landing gear for seaplanes that eliminates the large impact presently imposed upon the hull on take off and landing.

It is another object of the present invention to provide an improved landing gear for seaplanes that prevents the hull from bouncing into the air at the first physical contact of the landing gear with the water upon landing.

Another object of the invention is to provide an improved landing gear for seaplanes that acts to shorten the distance required in take-off.

A still further object of the present invention is to provide an improved landing gear for seaplanes that is provided with flexible knee action to cushion the impact upon landing.

A still further object of the present invention is to enable the pilot to obtain a horizontal chord line of the aircraft soon after the power unit of the aircraft has been placed in operation.

Another object of the present invention is to provide an improved landing gear for seaplanes that may be retracted completely within the envelope of the plane during flight.

Other objects and the nature and advantages of the instant invention will be apparent from the following description taken in conjunction with the accompanying drawings, wherein:

Fig. 1 is an elevational view of a seaplane showing the landing gear in position for take-off;

Fig. 2 is an elevational view of the seaplane showing the landing gear in retracted position within the envelope of the plane;

Fig. 3 is a perspective view showing the landing gear detached from the plane with the cables in position for landing;

Fig. 4 is a detail showing the cables in spread apart position for landing; and

Fig. 5 is a detail showing the cables in retracted position for take-off.

These and other objects are accomplished by the following invention, wherein the landing gear is composed of a plurality of cables which are mounted between a pair of suitable strut structures depending from the body of the plane whereby the distance between adjacent cables may be varied as desired, the angle of the cables with respect to the plane may be varied, and the entire structure may be retracted within the envelope of the plane during flight.

This invention is based upon the theory that a plurality of cables mounted side-by-side separated a given distance when moved into contact with water will cut the water like a series of knives without impact, and will penetrate into the water without being bounced upwardly out of the water as would be the case using a solid surface in place of the cables. On the other hand, when a plurality of cables mounted side-by-side are spaced close together, even though not in contact with one another, the assembly will act as a solid surface when moved in a body of water.

This theory has now been applied to the landing gear of seaplanes, and in accordance with the present invention as illustrated in the attached drawings, a plurality of cables 10 are mounted in a single plane attached at the forward end to a cross member 12 and at the rear end to a cross member 14. It should be noted that the cables are approximately the same length as the fuselage of the plane. Means are provided for rotating the cross members 12 and 14 whereby the cables may be wound upon the cross members for shortening the lengths of the cables when retracted into the body of the plane. The means for rotating the cross members 12 and 14 are not illustrated, however, any known means can be used such as by motors and gearing controlled from the cockpit of the plane.

As illustrated, eighteen cables approximately ¼" in diameter are provided, although any number of cables may be used of any size, depending upon the size and weight of the seaplane. In the take-off position, the cables are maintained in a closely spaced relationship, as shown in Fig. 5, although they need not be touching one another. The cables, even though ½" or so apart, will function similarly to a solid surface when pulled through the water at high speeds and will rise to the surface and act similarly to a large single ski during take-off.

For landing, the cables are moved to the separated position illustrated in Fig. 4, wherein the cables are sufficiently separated that when pulled through the water at high speed, the cables do not act as a solid surface but, on the contrary, act as individual knives which cut into the water and become submerged. The cables are arranged during take-off and landing so as to tilt upwardly at the forward end to form an acute angle with the water surface.

This phenomenon of cutting into the water by the cables to obtain instantaneous penetration with the elimination of the impact and bouncing off the water is particularly effective for permitting landing in rough waters.

Although the illustrated form of the invention discloses the plurality of cables being mounted in a single plane, it should be understood that other forms of the invention are possible. For example, the cables may be mounted in the cross sectional pattern of a V, or two or more planes of cables may be utilized, which may be interfitted into a single plane to form the close-together relationship of the cables or separated into the two or more planes for the separated position.

The cross members 12 and 14 are shaped as airfoils so as to reduce the resistance to air and water pressure as much as possible. The forward cross member 12 is mounted between the ends of a pair of struts 16, which are attached at their other ends to the body of the seaplane S adjacent the forward end thereof. Means, not shown, are provided for rotating the struts 16 approximately 180° with respect to the body of the seaplane from the forwardly projecting virtually horizontal position during landing and take-off, as shown in Fig. 1, to the rearwardly projecting virtually horizontal position during flight, as shown in Fig. 2.

The rear cross member 14 is mounted between the ends of a pair of struts 18, which are attached at their other ends to the ends of a pair of struts 20. The other ends of the struts 20 are attached to the body of the seaplane adjacent to the rear end thereof. The junctions 22 of the struts 18 and 20 are provided, for example, with friction hinges which lend rigidity to the structure and yet permit of a knee action at this joint.

A U-shaped member 26, having a pair of legs 28 and a cross member 30, is attached to the ends of the struts 18 outwardly of the cross member 14. The U-shaped member is pivotally attached at this joint 32 and can be moved from its stored position out of contact with the cables to its functioning position, as shown in Fig. 3, in contact with the cables 10 to vary the angle A between the cables and the horizontal as shown in Fig. 1. Means are provided for actuating the position of the cross member 14 with respect to the body of the seaplane, and for varying the position of the U-shaped member 26 about the pivot points 32. When the U-shaped member 26 is in contact with the cables 10, the cables are tensioned sufficiently to permit of the landing and take-off operations.

As illustrated, a cylinder 33 and piston 34 are provided for the purpose of controlling the position of the U-shaped member 26. The cylinder 33 is pivotally attached at 35 to the body of the plane, and the piston 34 is attached to a cross bar 37 which connects the legs 28 of the U-shaped member 26 at a point intermediate of their length. The ends of the cross member 14 are likewise attached in a suitable manner to the plane to control its position, or its position can be regulated solely by the operation of the struts 18 and 20.

When the U-shaped member 26 is in its lowermost position, its cross piece 30, which is made extremely thin, comes into contact with the cables, forcing them downwardly with respect to the cross members 12 and 14 to yield a taut series of cables at the angle A (Fig. 1) to the horizontal. The shock imposed upon the cables and struts upon landing and take-off is thus absorbed by the resulting knee action of the pivot points 22 between the struts 18 and 20.

Within each of the legs 28 of the U-shaped member 26 is housed a feeler member 39 which may be reciprocated from a position completely housed within the legs to an extended position, as shown in Fig. 1, extending outwardly therefrom. These feeler members 39 when in the extended position will first contact the water upon landing and serve as an indicator and aid to the pilot upon landing and take-off.

The cables 10 are attached to the cross members 12 and 14 in a manner as illustrated in Figs. 4 and 5 such that their spacing with respect to each other can be controlled. Cross members 12 and 14 may be actuated in similar manners, so only the cross member 12 will be described. The cross member 12 has an outer envelope which can be rotated by a suitable motor and gear arrangement when it is desired to wind or unwind the cables upon the cross member when the length of the cables is to be shortened or lengthened, such as when retracting the landing gear within the fuselage of the plane as shown in Fig. 2.

Various means may be utilized for controlling the amount of separation of the cables from each other. One suitable means is illustrated in Figs. 4 and 5, wherein a shaft 36 is provided with a plurality of cable retainers 38 mounted thereon. Each cable retainer 38 is adapted to receive the end of one cable and is provided with a gear in contact with gear teeth provided on the outer surface of the shaft 36. The gear ratio varies between successive cable retainers 38 extending outwardly from the mid cable or cables in each direction, so that upon rotation of the shaft 36 in one direction, the cable retainers 38 will move apart to the position shown in Fig. 4, and when rotated in the opposite direction, the cable retainers 38 will move together to the position shown in Fig. 5. Suitable gearing and motors are provided at the ends of the shaft 36 to produce the required rotation of the shaft 36 in the direction desired. Other suitable means can be provided for effecting the desired spacing of the cable retainers. One such means is the use of more than one series of cables as heretofore described.

The pivotal arrangement of the struts 16 with respect to the fuselage of the plane in combination with the pivotal arrangement of the struts 18 and 20 provide means for varying the angle of the cables with respect to the chord line of the plane, so that on take-off, for example, when the nose of the seaplane in reaction to the speed and resistance of the water tends to nose upwardly, by proper control of the position of the struts, the angle of the cables can be varied to maintain the chord line of the plane horizontal. This is an important item since it permits the engines of the plane likewise to be maintained horizontal and thus utilize 100% of the output of the engines in a horizontal direction so as to coincide with the direction of movement of the plane on the water. In conventional seaplanes during take-off, the nose extends upwardly, whereby the chord line of the plane, and consequently the engines, assumes an angle to the horizontal, so that during the horizontal taxiing during take-off, a large share of the thrust of the engines is lost in a vertical component thereof. In accordance with the present invention, this is corrected since the manipulation of the angle of the cables can be made to keep the plane horizontal during take-off.

In taking off, the cables are moved in close together position, and as the taxiing proceeds, the forward struts 16 are moved forwardly to the position shown in Fig. 1. The position of the forward cross member 12 is set depending upon the surface of the water, the struts being elevated to a greater extent for rougher water and to a lesser extent for smoother water. The angle of the cables is adjusted by proper positioning of the rear cross member 14 and the position of the U-shaped member 26.

When the proper speed for take-off has been obtained, at the point in the take-off when the plane is about ready to leave the surface of the water, the U-shaped member 26 may be kicked downwardly suddenly to give an added thrust upwardly to the plane against the water to assist in the take-off. This results in a sort of jumping out of the water in the manner of a cricket.

After the plane is airborne, the cables are wound on the cross members 12 and 14 and the struts are pivoted inwardly and upwardly within the fuselage of the plane. Pivoted doors on the lower surface of the plane, not shown, are provided to close when the landing gear has been retracted, whereby the entire landing gear is enclosed within the envelope of the plane.

On landing, the front struts 16 are pivoted forwardly to the position of Fig. 1, and the rear struts are dropped, thus unwinding the cables with the U-shaped member 26 coming into contact with the cables as shown in Fig. 1. Spacing of the cables on the cross members 12 and 14 is then adjusted for landing into the separated position of Fig. 4. On approaching the water, the first contact of the plane with the water after the feelers 39 will be upon the cables at the thin cross member 30, thus presenting a maximum of resistance to the water. Due to the maximum spacing of the cables, they will act as knives to cut the water in a plurality of points and penetrate into the water, thus reducing the impact and bouncing which takes place using conventional solid skis that give flat solid surface contact with the water.

A pair of hydrofoils 40 extend outwardly from the struts 18 at a point near the cross bar 14 to assist in stabilizing the plane laterally during take-off and landing.

When taxiing in take-off or otherwise, these hydrofoils can be used as rudders for directing the plane. For light aircraft, wheels can be incorporated into the landing gear as desired for taxiing onto land.

It will be obvious to those skilled in the art that various changes may be made without departing from the spirit of the invention and therefore the invention is not limited to what is shown in the drawings and described in the specification but only as indicated in the appended claims.

What is claimed is:

1. In a landing gear for seaplanes, a plurality of cables, a forward strut structure, a rear strut structure, said structures depending from said seaplane, said cables being attached to said strut structures at their respective ends, and means for maintaining said cables taut during take-off and landing operations.

2. In a landing gear for seaplanes in accordance with claim 1, wherein means are provided for varying the space between adjacent cables from a position wherein the cables are in closely aligned relationship to a position wherein the cables are in a spread-apart relationship.

3. In a landing gear for seaplanes in accordance with claim 1, wherein means are provided for varying the angle of said cables with respect to the chord line of said seaplane.

4. In a landing gear for seaplanes in accordance with claim 1, wherein said cables are mounted in parallel relationship in a single horizontal plane.

5. In a landing gear for seaplanes in accordance with claim 4, wherein means are provided for varying the space between adjacent cables from a position wherein the cables are in closely aligned relationship to a position wherein the cables are in a spread-apart relationship.

6. In a landing gear for seaplanes, a plurality of parallel cables, a forward strut structure and a rear strut structure, said structures depending from said seaplane, cross members at the ends of said structures, said cables being attached to said strut structures at their respective ends, means for rotating said cross members whereby said cables are wound and unwound thereon to vary the length of the exposed cables.

7. In a landing gear for seaplanes in accordance with claim 6, wherein means are provided for varying the space between adjacent cables on said cross members from a closely aligned position to a spread-apart position.

8. In a landing gear for seaplanes in accordance with claim 6, wherein means are provided for varying the angle of the plane of said cables with respect to the chord line of said seaplane.

9. In a landing gear for seaplanes in accordance with claim 7, wherein means are provided for varying the angle of the plane of said cables with respect to the chord line of said seaplane.

10. In a landing gear for seaplanes in accordance with claim 6, wherein means are provided for retracting said cables and strut structures upwardly within the envelope of said seaplane.

11. In a landing gear for seaplanes in accordance with claim 6, wherein means are provided for maintaining said cables taut during take-off and landing operations.

12. In a landing gear for seaplanes in accordance with claim 1, wherein said rear strut structure is made up of at least two pivotally attached struts provided with means for yielding a knee action upon impact.

13. In a landing gear for seaplanes in accordance with claim 12, wherein the struts on said rear strut structure are provided with laterally extending hydrofoils to yield lateral stability to said seaplane.

14. In a landing gear for seaplanes in accordance with claim 1, wherein said means for maintaining said cables taut comprises a U-shaped member comprising a pair of legs and a cross piece, said member being pivoted at the ends of said legs to said rear strut structure, and means for rotating said cross piece into contact with said cables.

15. In a landing gear for seaplanes in accordance with claim 14, wherein a pair of feeler members are provided attached at one end thereof to each said leg, and extending outwardly from said legs at the opposite end whereby said opposite ends of said feeler members extend below said cables.

16. In a landing gear for seaplanes in accordance with claim 11, wherein said means for maintaining said cables taut comprises a U-shaped member comprising a pair of legs and a cross piece, said member being pivoted at the ends of said legs to said rear strut structure, and means for rotating said cross piece into contact with said cables.

17. In a landing gear for seaplanes in accordance with claim 16, wherein a pair of feeler members are provided attached at one end thereof to each said leg, and extending outwardly from said legs at the opposite end whereby said opposite ends of said feeler members extend below said cables.

References Cited in the file of this patent

FOREIGN PATENTS 267,071   Germany _____ Nov. 6, 1913